(12) United States Patent
Nottke (10) Patent No.: US 9,550,109 B1
(45) Date of Patent: Jan. 24, 2017

(54) VIDEO STRING POKER

(75) Inventor: Timothy G. Nottke, Toledo, OH (US)

(73) Assignee: Timothy G. Nottke, Toledo, OH (US)

( * ) Notice: Subject to any disclaimer, the term of this patent is extended or adjusted under 35 U.S.C. 154(b) by 0 days.

(21) Appl. No.: 13/413,683

(22) Filed: Mar. 7, 2012

Related U.S. Application Data (63) Continuation-in-part of application No. 12/761,424, filed on Apr. 16, 2010, now abandoned.

(60) Provisional application No. 61/169,934, filed on Apr. 16, 2009.

(51) Int. Cl.
  *G06F 13/00* (2006.01)
  *A63F 1/00* (2006.01)

(52) U.S. Cl.
  CPC .......... *A63F 1/00* (2013.01); *A63F 2001/005* (2013.01)

(58) Field of Classification Search
  CPC .................. A63F 2001/005; A63F 2001/008
  USPC ....................................... 463/11–13
  See application file for complete search history.

(56) References Cited

U.S. PATENT DOCUMENTS

| | | | |
|---|---|---|---|
| 5,308,065 A | 5/1994 | Bridgeman et al. | |
| 5,415,404 A | 5/1995 | Joshi et al. | |
| 5,531,441 A | 7/1996 | Dabrowski et al. | |
| 5,772,506 A | 6/1998 | Marks et al. | |
| 5,823,873 A | 10/1998 | Moody | |
| 5,868,619 A | 2/1999 | Wood et al. | |
| 5,882,258 A | 3/1999 | Kelly et al. | |
| 6,007,066 A | 12/1999 | Moody | |
| 6,098,985 A | 8/2000 | Moody | |
| 6,110,040 A | 8/2000 | Sanduski et al. | |
| 6,135,883 A | 10/2000 | Hachquet | |
| 6,149,521 A | 11/2000 | Sanduski | |
| 6,159,095 A | 12/2000 | Frohm et al. | |
| 6,257,979 B1 | 7/2001 | Walker et al. | |
| 6,450,883 B1 | 9/2002 | O'Halloran | |
| 6,474,645 B2 | 11/2002 | Tarantino | |
| 6,561,898 B2 | 5/2003 | Moody | |
| 6,569,013 B1 | 5/2003 | Taylor | |
| 6,595,520 B1 | 7/2003 | Richards et al. | |
| 6,612,926 B1 | 9/2003 | Dabrowski | |
| 6,612,927 B1 | 9/2003 | Slomiany et al. | |
| 6,708,975 B1 | 3/2004 | Fox et al. | |
| 7,037,190 B2 | 5/2006 | Moody et al. | |
| 7,247,091 B2 | 7/2007 | Moody | |
| 7,247,092 B2 | 7/2007 | Jarvis et al. | |
| 7,448,947 B2 | 11/2008 | Englman et al. | |
| 7,614,946 B2 | 11/2009 | Nicely | |
| 8,105,144 B2 | 1/2012 | Englman et al. | |
| 8,113,933 B2 | 2/2012 | Thomas | |
| 8,147,310 B2 | 4/2012 | Jarvis et al. | |
| 8,152,616 B2 | 4/2012 | Moody | |
| 2002/0034974 A1 | 3/2002 | Wood et al. | |
| 2003/0038425 A1 | 2/2003 | Tarantino | |

(Continued)

*Primary Examiner* — Ronald Laneau
*Assistant Examiner* — Ross Williams
(74) *Attorney, Agent, or Firm* — Donald K. Wedding (57) ABSTRACT

A method and system of generating and displaying a game of chance with a computer on an electronic device to a player, wherein the player places a wager on a primary poker hand dealt from a deck of cards and a secondary string bonus hand of one to five cards. The game may be played on site at a legal game casino, in a non-gambling mode on-line over the internet, or off-line on a home computer using a disc such as a compact disc. The game could also be played as a game in gambling or non-gambling mode at a tavern, bar, or the like.

9 Claims, 11 Drawing Sheets

(56) References Cited

U.S. PATENT DOCUMENTS

| | | |
|---|---|---|
| 2003/0153377 A1 | 8/2003 | Lisowski, Sr. |
| 2003/0189290 A1 | 10/2003 | Moody |
| 2004/0132524 A1 | 7/2004 | Ramstad et al. |
| 2005/0230917 A1 | 10/2005 | Jackson |
| 2006/0246980 A1* | 11/2006 | Walker et al. .................. 463/13 |
| 2008/0076500 A1* | 3/2008 | Lancaster et al. .............. 463/12 |
| 2011/0117980 A1 | 5/2011 | Parham |
| 2011/0201398 A1 | 8/2011 | Parham |

* cited by examiner

VIDEO STRING POKER

RELATED APPLICATIONS

This application is a continuation in part under 35 U.S.C. 120 and claims priority from copending U.S. patent Ser. No. 12/761,424 filed Apr. 16, 2010 now abandoned which claims priority under 35 U.S.C. 119(e) from Provisional Application Ser. No. 61/169,934 filed Apr. 16, 2009, both incorporated herein by reference.

FIELD OF INVENTION

This invention relates to a method for playing video poker wherein a standard five card hand is dealt and a bonus scheme wherein a string of cards creates a secondary bonus hand. The cards for the five card hand are dealt from a standard deck of 52 cards using a computer and a random number generator.

RELATED PRIOR ART

The following references disclose a video poker game wherein multiple hands are dealt per game for a single player: U.S. Pat. No. 6,098,985 (Moody), U.S. Pat. No. 6,474,645 (Tarantino), U.S. Pat. No. 6,511,068 (Sklansky et al.), U.S. Pat. No. 6,561,898 (Moody), U.S. Pat. No. 7,247,092 (Jarvis et al.), U.S. Pat. No. 7,156,397 (Moody et al.), U.S. Pat. No. 6,443,456 (Gajor), U.S. Patent Publication Nos. 2003/0038425 (Tarantino), 2004/0219970 (Tarantino), and 2005/0026668 (Tarantino), all incorporated herein by reference.

U.S. Patent Publication No. 2006/0287058 (Resnick et al.) discloses a gaming system with multiple game types, and is incorporated herein by reference.

The following references disclose an improved poker game: U.S. Pat. No. 7,137,628 (Moody), U.S. Pat. No. 7,222,856 (Dodge), U.S. Pat. No. 7,222,857 (Moody), U.S. Pat. No. 7,222,858 (Moody), and U.S. Patent Publication 2006/0281513 (Kirkpatrick), all incorporated herein by reference.

The following references disclose a gaming device with a bonus scheme: U.S. Pat. No. 6,506,118 (Baerlocher et al.), U.S. Pat. No. 6,514,141 (Kaminkow et al.), U.S. Pat. No. 7,022,016 (Wood et al.), and U.S. Pat. No. 7,247,092 (Jarvis et al.), all incorporated herein by reference.

The following prior art references disclose electronic or computerized gaming devices: U.S. Pat. No. 5,042,809 (Richardson), U.S. Pat. No. 6,248,016 (Walker et al.), U.S. Pat. No. 6,332,839 (Walker et al.), U.S. Pat. No. 7,022,016 (Wood et al.), U.S. Pat. No. 7,222,857 (Moody), U.S. Pat. No. 7,247,091 (Moody), and U.S. Design Pat. No. Des. 395,463 (Scott et al.), all incorporated herein by reference.

U.S. Pat. No. 6,201,532 (Tode et al.), incorporated herein by reference, discloses an electronic gaming device with a deck mounted touch screen.

THE INVENTION

This invention relates to a video poker game wherein a player is dealt a primary hand of five cards face up from a standard 52 card deck after a wager is placed and a bonus scheme wherein a string of cards creates a secondary bonus hand using a random number generator to determine the cards to be dealt to the primary hand. An additional wager is required to initiate the secondary bonus hand or string hand. The cards of the primary hand are arranged in one row, with the secondary bonus hand arranged in another row above the primary hand. The player chooses which cards are held in the primary hand, which cards are discarded, and which duplicate card from the primary hand is to be moved to the secondary bonus hand after a win in the primary hand is achieved.

A winning hand payout is based on a predetermined pay scale and the winnings are displayed on a credit meter.

If the primary hand does not yield a win, then the secondary bonus hand, also known as a string hand, is broken and no further bonus payout is available. The bonus payout is based on a predetermined pay scale and displayed on a bonus credit meter.

Any or all of this game may be played with an actual dealer or with a computerized gaming console with a video screen such as a CRT or a flat screen display such as plasma, LCD, OLED, or LED. The game may be played on site at a legal game casino, in a non-gambling mode on-line over the internet, or off-line on a home computer using a disc such as a compact disc (CD), or digital video disc (DVD), or portable flash drive. The game could also be played as a game in gambling or non-gambling mode at a tavern, bar, home, or the like.

The present game can be played with multiple hands and/or with multiple players. The game may also be played on a video game system such as Xbox Live, Playstation, or Nintendo Wii. Xbox is a trademark of the Microsoft Corporation and Playstation is a trademark of the Sony Corporation.

The gaming console may include a computer with a random number generator, and an integrated touch system to facilitate player input. The touch system may be an infrared (IR) touch system, capacitive touch system, resistive touch system, surface acoustical wave touch system, or an inductive touch system, mounted to the cabinet or to the bezel of the screen. A keyboard, cursor, or other input device may be used.

A typical game may comprise the following steps:
1. A player initiates game play by placing a wager on the primary hand. The secondary bonus hand, or string hand, is initiated by placing another wager. The player receives at least one card in the string hand with four place holders. Each card placed in the string hand is a copy of one of any 52 cards in a standard deck.
2. The primary hand is played in the same manner as any other five card video poker game, wherein any number of cards from zero to five can be held, and the remaining zero to five non-held cards are discarded and replaced by cards from the remaining standard deck to form a final primary hand.
3. After every winning final hand, credits are determined by a predetermined pay scale and are placed in a credit meter. The player may select a card from the winning final hand. A copy of the selected card is placed in the string hand.
4. If the player wins consecutive hands, the player may continue to select cards from the winning final primary hand with a copy to be placed in the string hand until all of the place holders in the string hand are filled. Bonus credits are determined by a predetermined pay scale and are placed in a credit meter. The player is paid anytime he has a winning string hand even if only two cards are in the hand, for example Jacks or better.
5. If a player decides to place a copy of a card that is exactly the same rank and suit (duplicate) as an existing card in the string hand, that duplicate card in the string hand creates a multiplier. There may or may not be a limit to the number of multipliers per duplicate card. The multipliers will increase in increments of one each time a duplicate copy of the same card appears in the string hand. The multiplier applies to the string hand being used to multiply a winning hand in the string hand.

6. If the player wins consecutive hands and then loses a hand, the string hand is broken, Bonus credits are determined by the predetermined pay scale and placed in a credit meter. This ends the bonus string hand and removes all the copies of the cards in the string hand.

7. If the player wins consecutive hands, fills all of the available place holder spaces in the string hand and continues to win, the game will continue to pay the player credits according to the predetermined pay scale and the credits are placed in the credit meter. The first card placed in the string hand will "drop off" and the rest of the cards will shift to the left. The string continues until the player loses and the string is broken. If the drop off card contains a multiplier, that multiplier may also drop off. Bonus credits are determined by the predetermined pay scale and are placed in the credit meter.

In one embodiment, there is more than one string hand.

In another embodiment, two or more cards are initially dealt to a string hand.

In another embodiment, the player may place two or more cards from the primary hand to the string hand.

Multiple n games may be played such as triple game play, five game play, ten game play, and so forth up to n game play. One embodiment of triple game play is shown in U.S. Pat. No. 5,823,873 (Moody) and U.S. Pat. No. 6,007,006 (Moody).

DETAILED DESCRIPTION OF THE DRAWINGS

Once a wager is placed for the primary hand, an additional wager is required to initiate the secondary bonus hand, or string hand. A primary hand is dealt from a standard deck of 52 cards using a random number generator to determine which cards are dealt in the primary hand, and a copy of a card is placed in the string hand. This card is a copy of any one of 52 cards in a standard deck.

Figure 1:
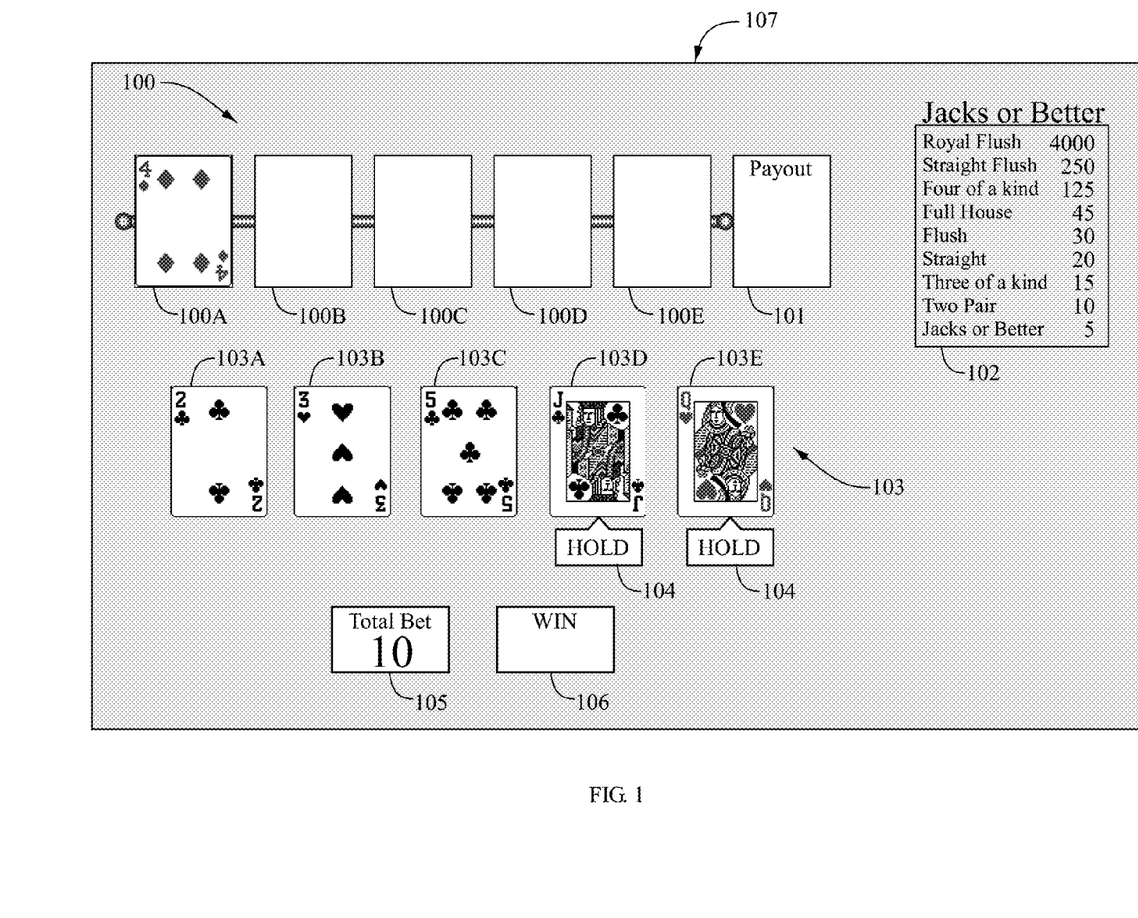
FIG. 1 shows an opening deal on the active game area with a primary hand dealt and a secondary bonus hand, or string hand with place holders, and one dealt card in the string hand. The dealt card is only a copy and may also appear in the primary hand.

FIG. 1 illustrates an opening deal in the active game area 107 with a primary hand 103 dealt, secondary bonus hand, or string hand 100, predetermined pay scale 102, wager meter 105 with ten credits, win or credit meter 106, secondary credit meter 101, card hold indicators 104, and one initial predetermined card 100A placed in the string hand 100. The place holders for additional cards are 100B, 100C, 100D, and 100E. The pay scale 102 is used in this illustration for both the primary hand and the string hand, but a separate pay scale may be used for each. In this illustration, an opening wager of five, initiates game play, plus a bonus wager of five, initiates the string hand, for a total often as displayed in the wager meter 105. Two separate bet meters may be used, one for the primary hand and one for the string hand. An opening hand is dealt using a random number generator to determine which cards are dealt in the primary hand 103, and one initial card 100A is placed in the string hand 100. This is a copy and a duplicate copy may also appear in the primary hand. The player chooses which cards will be held and a card hold indicator 104 is displayed beneath each card that is being held. As shown, the jack of clubs 103D and the queen of hearts 103E are held and the two of clubs 103A, three of hearts 103B, and five of clubs 103C are discarded.

Figure 1A:
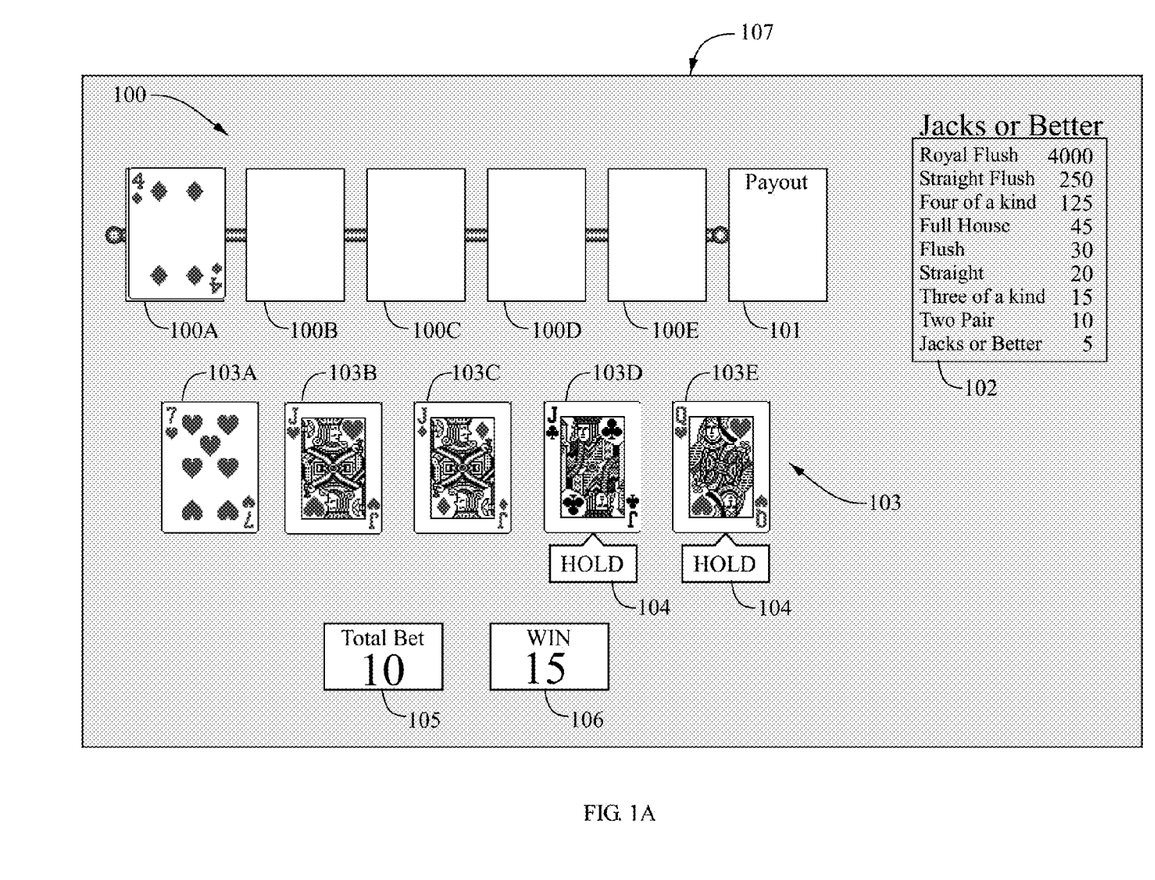
FIG. 1A shows held and dealt cards in the final primary hand.

As shown in FIG. 1A, the two of clubs, three of hearts, and five of clubs (as seen in 103A, 103B, and 103C in FIG. 1) are replaced by the seven of hearts 103A, the jack of hearts 103B, and the jack of diamonds 103C. The player wins this final primary hand with three of a kind and wins 15 credits. The winning credits are displayed in the credit meter 106.

Figure 1B:
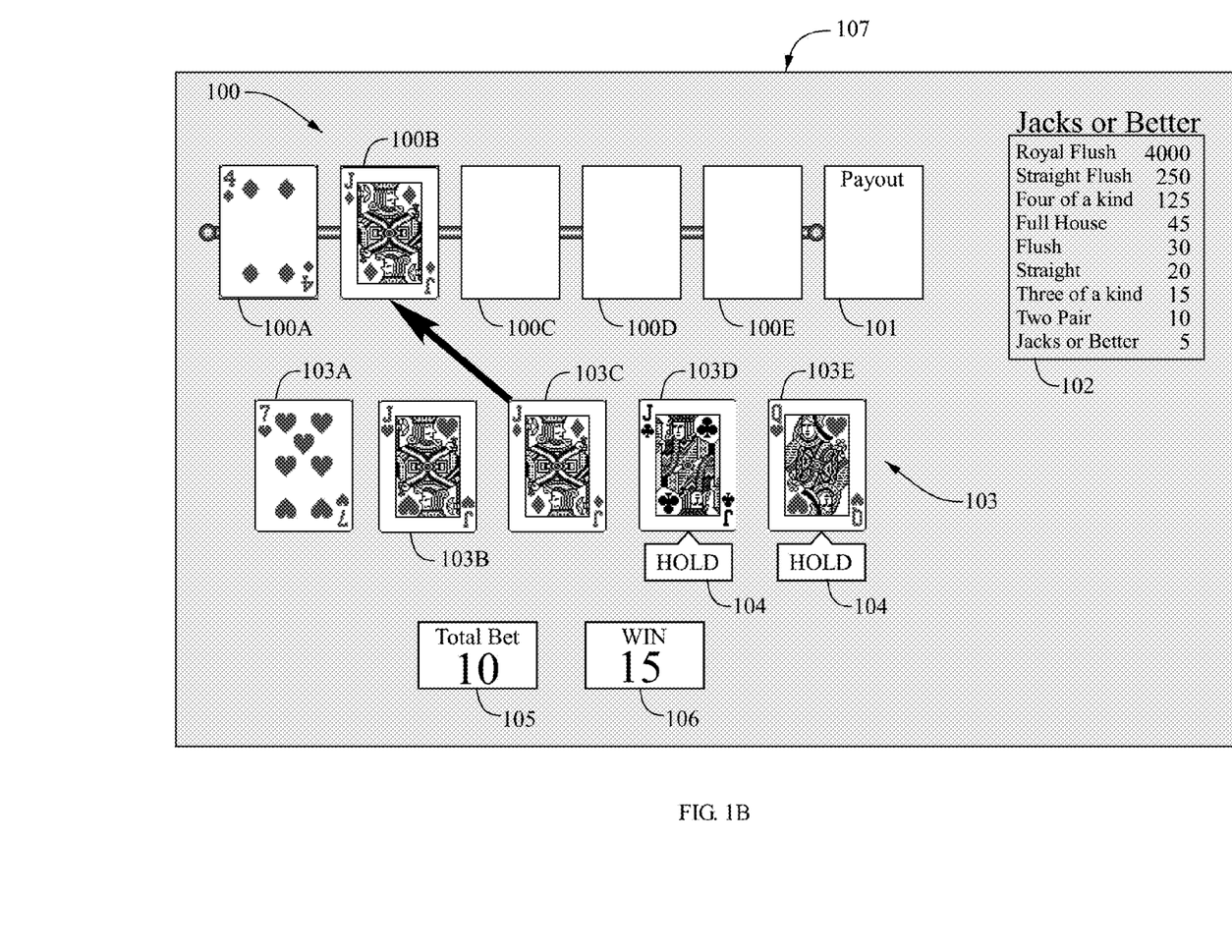
FIG. 1B shows a winning primary hand and a copy of a card from the winning primary hand being moved to the string hand.

FIG. 1B illustrates the placement of a copy of the jack of diamonds 103C in the string hand 100 in position 100B. Also shown in FIG. 1B are active game area 107 with a final primary hand 103 dealt, secondary bonus hand, or string hand 100, predetermined pay scale 102, wager meter 105 with ten credits, primary win meter 106 with 15 credits, secondary bonus hand, or string hand, with a four of diamonds in the 100A position, a jack of clubs in the 100B position, and secondary winnings meter 101.

Figure 1C:
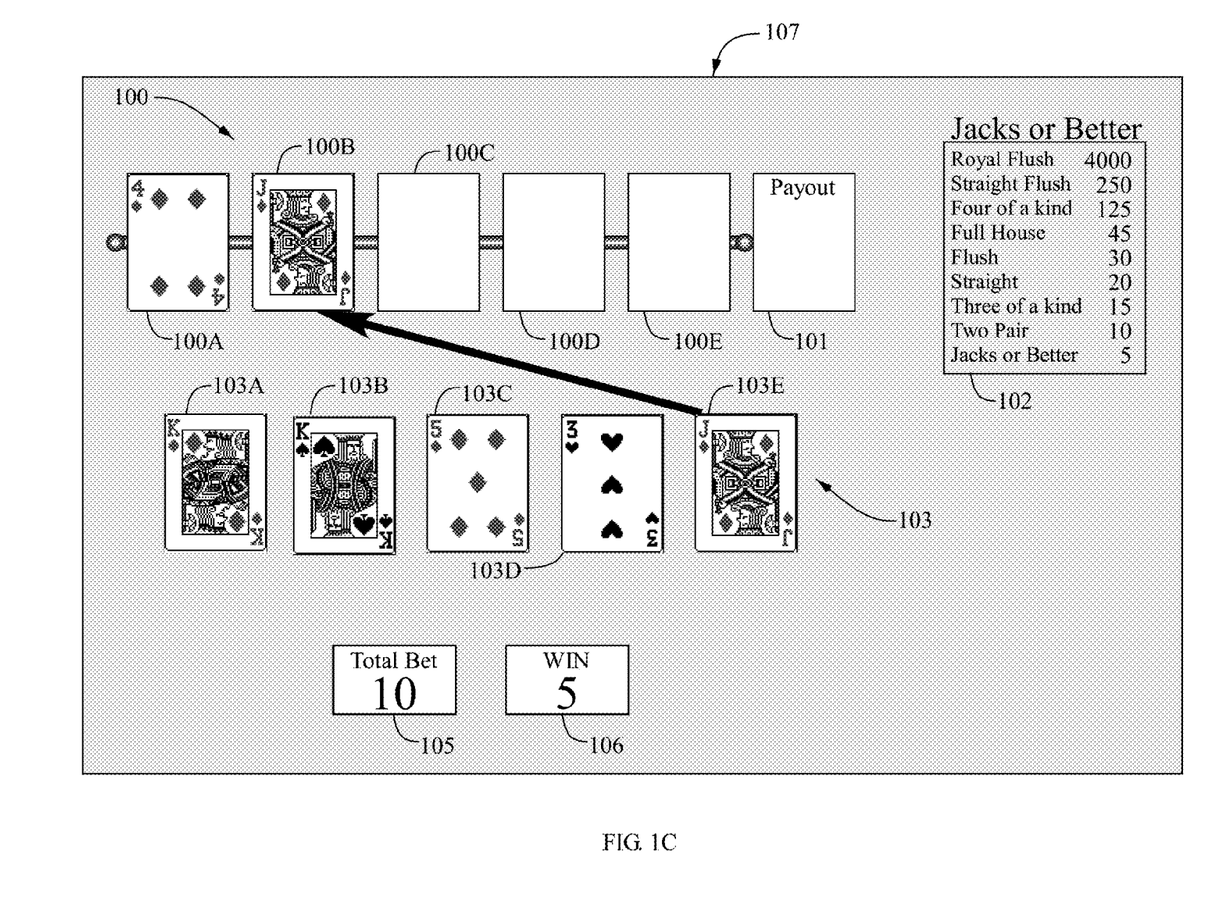
FIG. 1C shows the next winning hand on the active game area with a primary hand dealt and two cards in the secondary bonus hand, or string hand. This shows another jack of diamonds being placed on top of an existing jack of diamonds in the string hand. Thus creating a times two multiplier.

FIG. 1C illustrates a winning final primary hand in the active game area 107 with a final primary hand 103 dealt, secondary bonus hand, or string hand 100 with the four of diamonds 100A, the jack of diamonds 100B, predetermined pay scale 102, wager meter 105 with ten credits, primary win or credit meter 106 with five credits, and secondary win or payout meter 101. The player places a second jack of diamonds 103E in the string hand 100 in position 100B. The placement of the second jack of diamonds in string hand position 100B gives the player a multiplier of two times any winnings in the string hand.

Figure 1D:
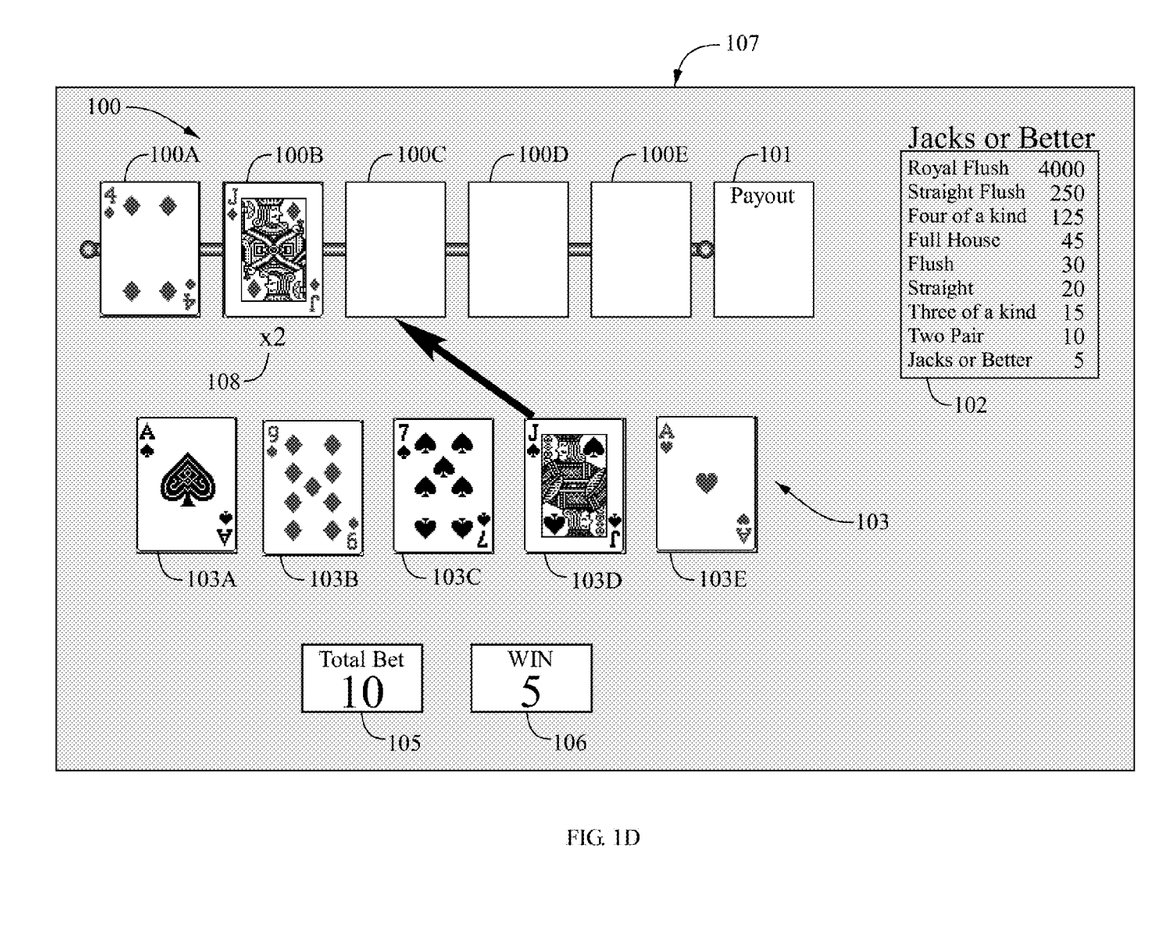
FIG. 1D shows the next winning hand on the active game area with a primary hand dealt, two cards in the secondary bonus hand, or string hand with a multiplier, and a new card, jack of spades, being moved to the string hand.

FIG. 1D illustrates a winning final primary hand in the active game area 107 with final primary hand 103 dealt, secondary bonus hand, or string hand 100 with the four of diamonds 100A, the jack of diamonds 100B, two times multiplier 108, predetermined pay scale 102, wager meter 105 with ten credits, primary win meter 106 with five credits, and secondary winnings meter 101. The player places a jack of spades 103D in the string hand 100 in position 100C to continue the string hand 100. If the player loses the next hand, the string hand will be broken, but will pay two times the payout for jacks or better, two times five=ten credits for the string hand.

Figure 1E:
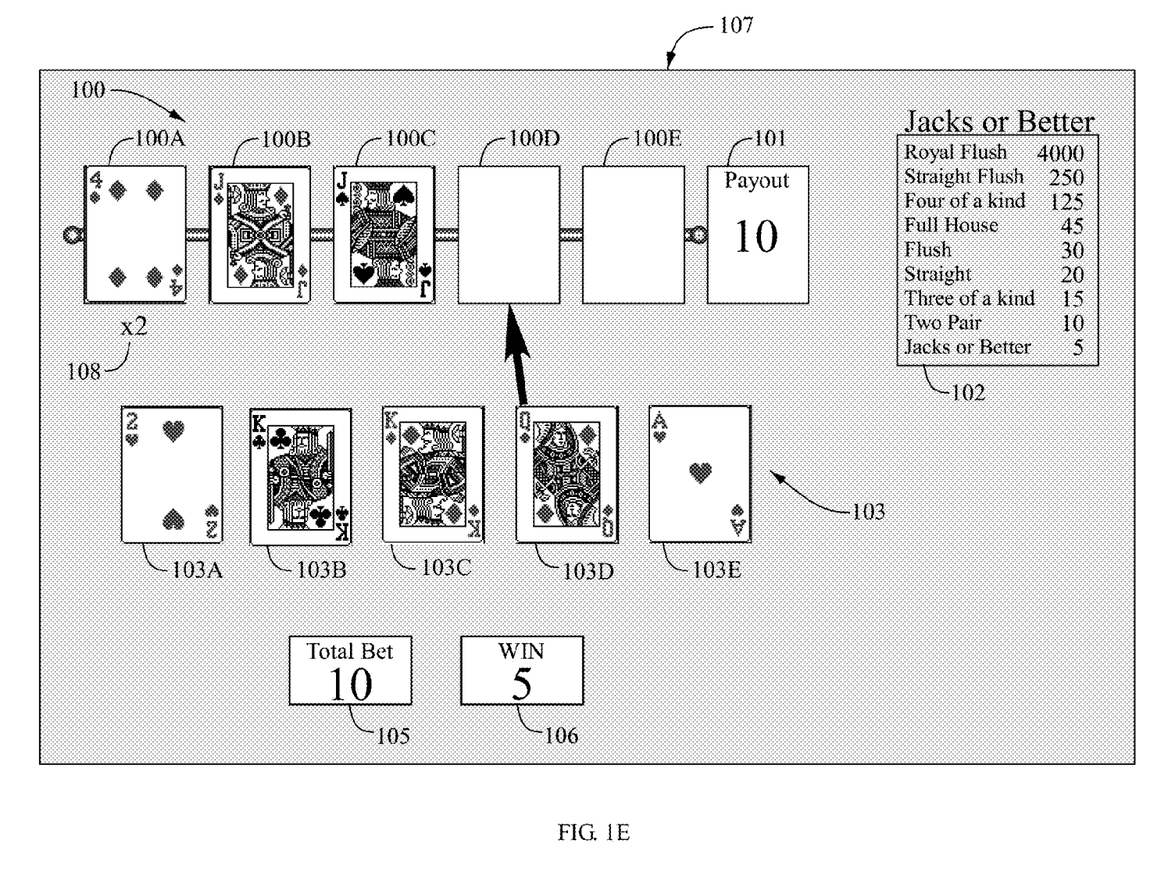
FIG. 1E shows the next winning hand on the active game area with a primary hand dealt, three cards in the secondary bonus hand, or string hand with a multiplier, and a new card, queen of diamonds, being moved to the string hand.

FIG. 1E illustrates a winning final hand in the active game area 107 with a final primary hand 103 dealt, secondary bonus hand, or string hand 100 with the four of diamonds 100A, the jack of diamonds 100B, two times multiplier 108 and the jack of spades 100C, predetermined pay scale 102, wager meter 105 with ten credits, win or payout meter 106 with five credits, and secondary win or payout meter 101. The player places a queen of diamonds 103D in the string hand 100 in position 100D to continue the string hand 100. If the player loses the next hand, the string hand will be broken, but will pay two times the payout for jacks or better, two times five=ten credits for the string hand.

Figure 1F:
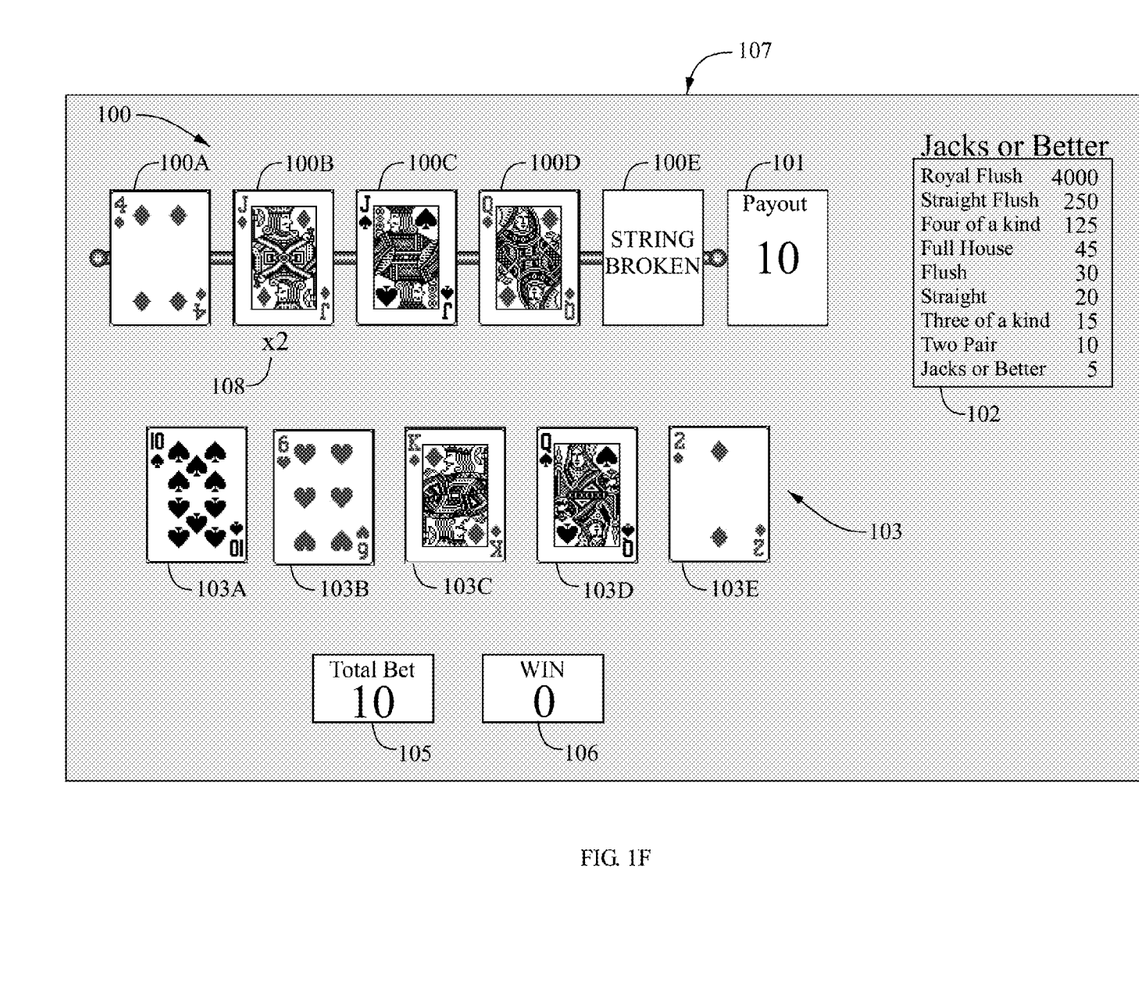
FIG. 1F shows a losing hand on the active game area with a primary hand dealt, four cards in the secondary bonus hand, or string hand with a multiplier, and the string hand being broken by a losing primary hand.

FIG. 1F illustrates a losing final hand in the active game area 107 with a losing final primary hand 103 dealt, secondary bonus hand, or string hand 100 with the four of diamonds 100A, the jack of diamonds 100A, two times multiplier 108, the jack of spades 100C and the queen of diamonds 100D, predetermined pay scale 102, wager meter 105 with ten credits, primary win meter 106 with zero credits, and win or payout meter 101 with ten credits. Since the player has lost this hand, the string hand has been broken, which is displayed in the string hand position 100E, and pays two times the payout for jacks or better, two times five=ten credits, which is displayed on the secondary win or payout meter 101.

Figure 2:
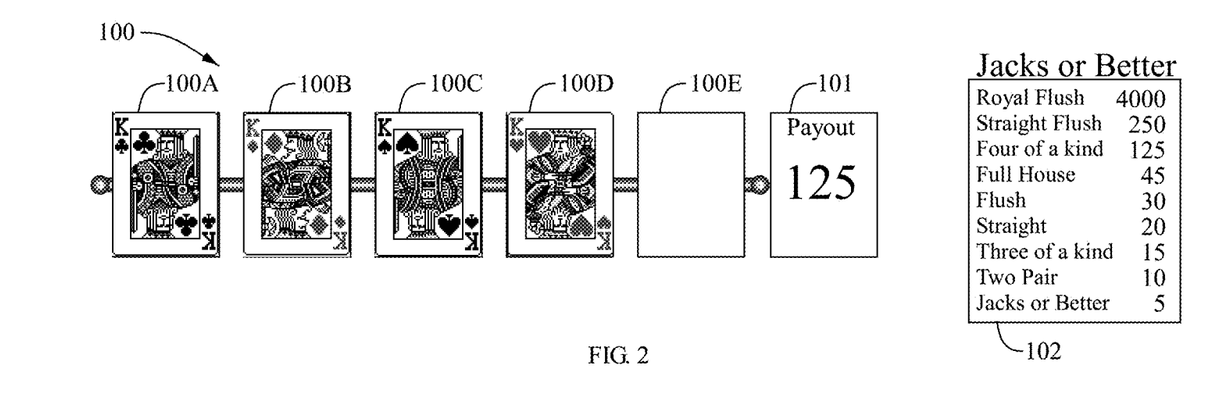
FIG. 2 shows other possibilities in the secondary bonus hand, or string hand, with four of a kind.

FIG. 2 illustrates another possible combination in the secondary bonus hand, or string hand 100, with four of a kind 100A, 100B, 100C, and 100D. In this combination, the king of clubs 100A was the initial predetermined card in the string hand 100. Since the player has won three consecutive hands, he is paid for two kings, three kings, and four kings. One payout occurs per placement of a card.

Figure 2A:
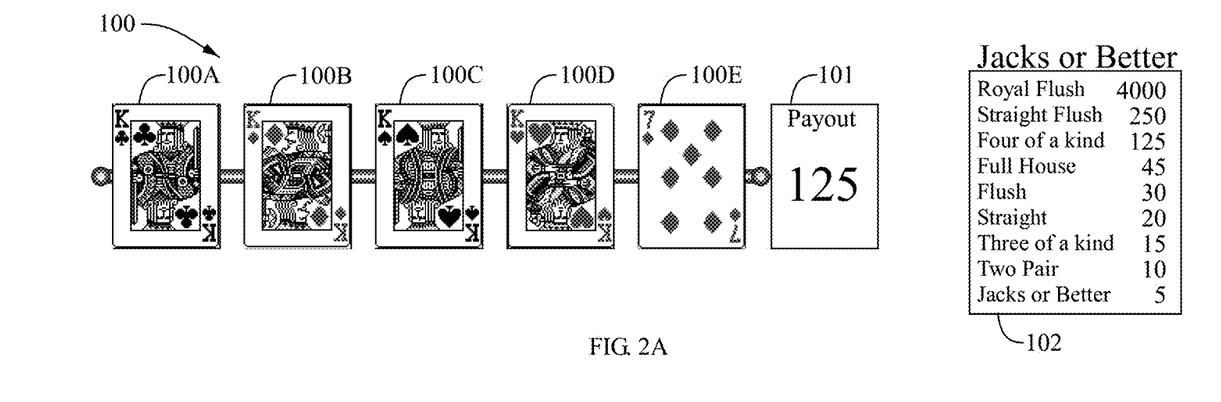
FIG. 2A shows the secondary bonus hand, or string hand, with five cards.

FIG. 2A continues the combination in the secondary bonus hand, or string hand 100 of FIG. 2, with four of a kind 100A, 100B, 100C, 100D and the seven of diamonds in the last string hand position 100E. In this combination, the king of clubs 100A was the initial predetermined card in the string hand 100. Since the string hand 100 has all of its positions filled, the string hand 100 pays out for four of a kind=125 credits, which is displayed on the secondary win or payout meter 101. The string hand drops the king of clubs from the 100A position and the player continues to play the next hand.

Figure 2B:
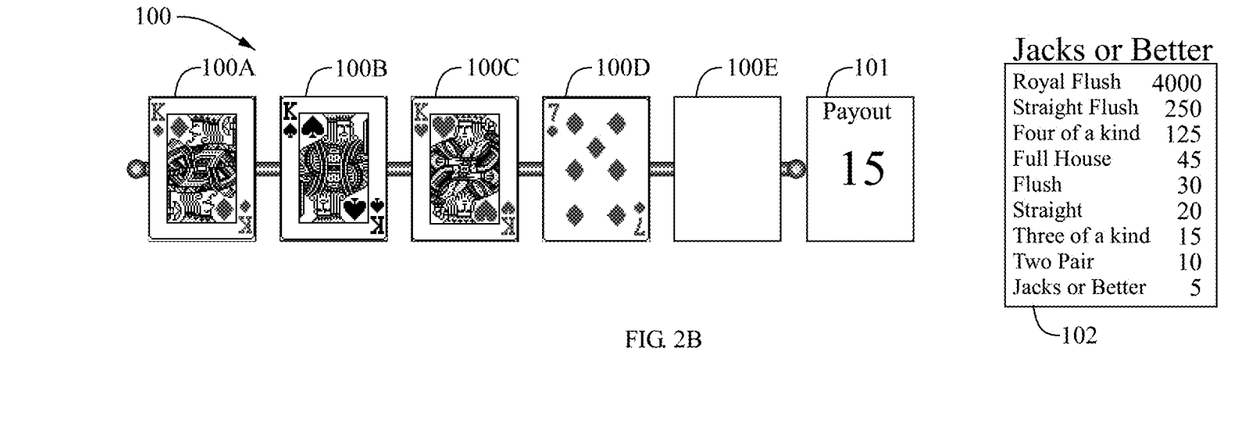
FIG. 2B shows the secondary bonus hand, or string hand, with four cards after the far card to the left on the string hand has dropped off.

FIG. 2B continues the combination in the secondary bonus hand, or string hand 100 of FIG. 2A, with three of a kind 100A, 100B, 100C, and the seven of diamonds 100D. Since the player has continued to win, the string hand has dropped the king of clubs from the 100A position and shifted the string to the left. Now the king of diamonds is in position 100A, the king of spades is in position 100B, the king of hearts is in position 100C, and the seven of diamonds is in position 100D. The player is paid for three of a kind.

Play continues in this manner until the string hand is broken by a loss in the primary hand.

Figure 3:
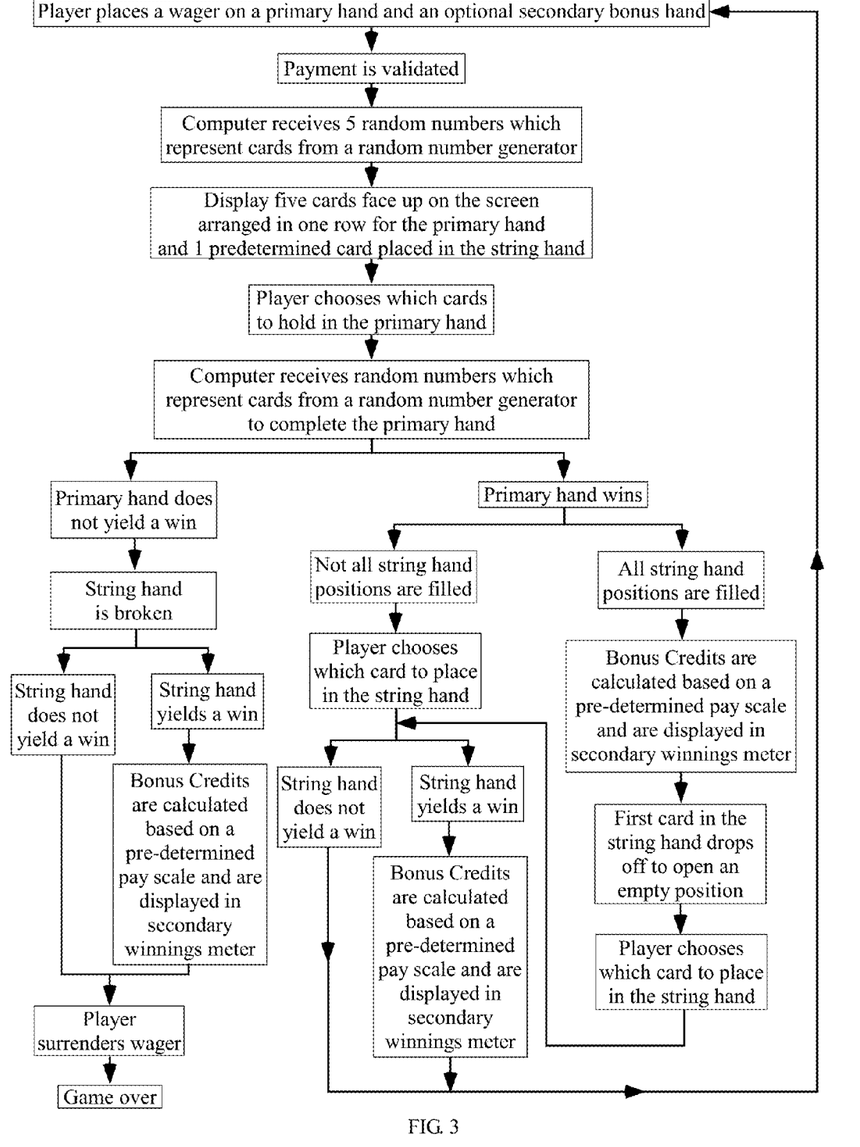
FIG. 3 shows a block diagram of game play.

FIG. 3 is a block diagram of typical game play. A Player places a wager on a primary hand and a wager on a secondary bonus hand. The computer validates the payment and sends a signal to the random number generator to send out six random numbers that represent cards, five for the primary hand and one for the secondary hand. The computer receives the random numbers and displays the representative cards face up on the screen and arranges them in one row of five for the primary hand, and one predetermined card is placed in the string hand, which is a copy of any one of 52 cards in a standard deck. The player then chooses zero to five cards to hold in the primary hand. The computer sends a signal to the random number generator to send out up to five random numbers that represent cards. The computer receives the random numbers and completes the primary hand.

If the primary hand does not yield a win, the string hand is broken. If the siring hand yields a win, then the winnings from the string hand are displayed on the secondary win or payout meter, completing the game. If the string hand does not yield, a win then the game is completed. The player surrenders the wager and the game is over.

If the primary hand wins, the player chooses a card from the winning hand to place in the string hand.

If the string hand yields a win, then the winnings from the secondary hand are displayed on the secondary win or payout meter, completing the game. The game continues by starting the process over again until the player loses a primary hand.

If the string hand does not yield a win, the game continues until the player loses a primary hand.

If the primary hand wins and all of the places in the string hand are filled, the first initial card in the string drops off and the remaining cards shift one card to the left, opening a position on the far right. The player chooses a card from the winning hand to place in the string hand. If the string hand yields a win, then the winnings from the secondary hand are displayed on the secondary win or payout meter. The game continues by starting the process over again until the player loses a primary hand. If the string hand does not yield a win, the game continues until the player loses a primary hand.

Figure 4:
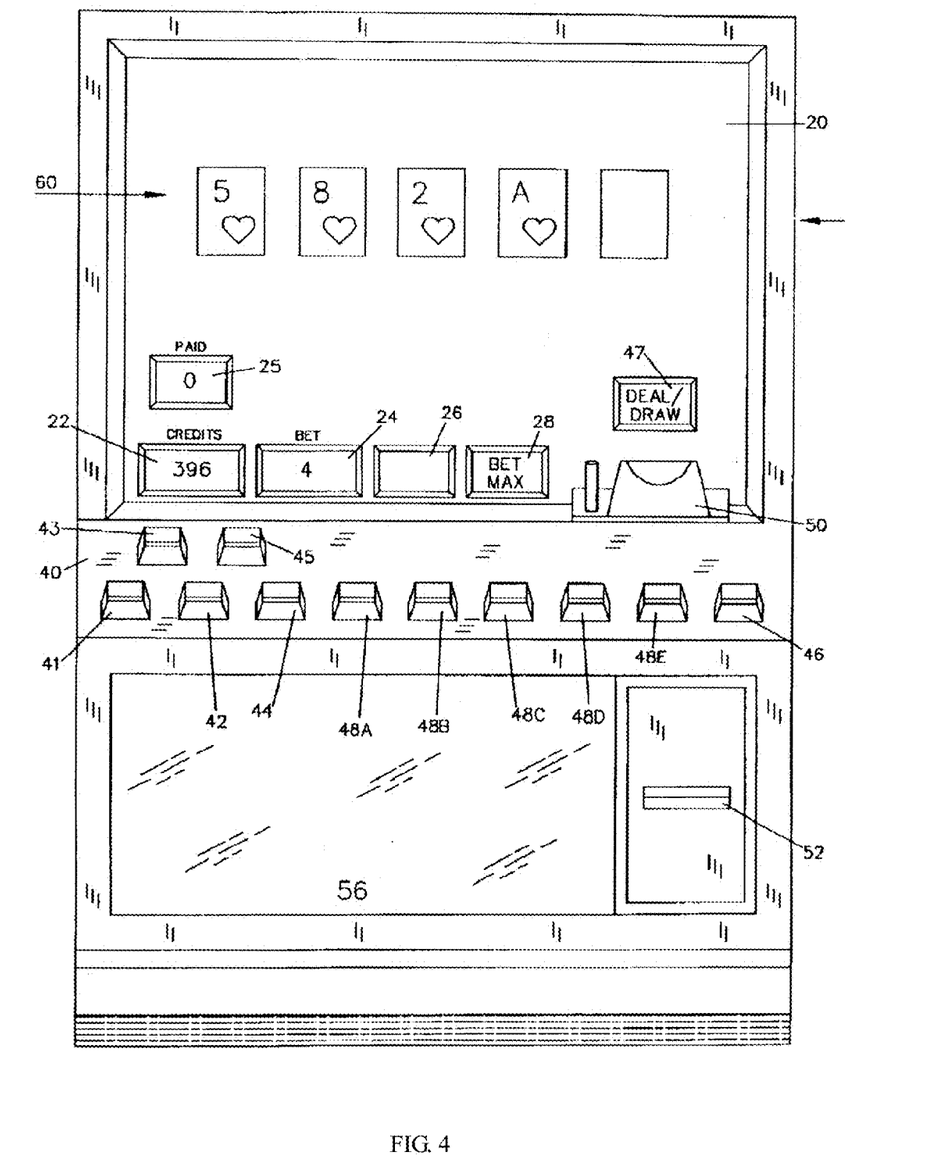
FIG. 4 illustrates a typical gaming console.

FIG. 4 shows a typical electronic video gaming machine 10 that is configured to provide to a player apparatus for a poker game such as the method and system of the present invention. The electronic video gaming machine 10 includes a conventional coin acceptor 50 into which the player can insert coins or gaming tokens and a bill acceptor 52 mounted to the gaming machine 10 and into which the player can insert paper currency or a cash in-cash out ticket (TITO). The use of coins, tokens, paper currency or TITO, is one mechanism by which a player may wager on the poker hands the player wishes to play. Also in the electronic video gaming machine 10, a credit meter display 22 is provided to show the amount of credits that the player has accrued on the gaming machine 10, either by inserting coins, tokens, paper currency, TITO, or from winning plays achieved by the player. Whenever the player makes a wager, the amount of the wager is subtracted from the credit meter display 22. Whenever the player achieves a winning play during the play of the game, the amount of the winning play is added to the credit meter display 22.

A conventional payout hopper is also located on the interior of the gaming machine and is used to dispense coins or tokens to the player into a payout tray 56 when the player wishes to collect any winning amounts the player has accrued. Other suitable and conventional payout mechanisms can be used, such as a ticket printer (TITO) or other cashless payout devices.

The gaming machine 10 also includes a video screen display 20 of any suitable size or type upon which representations of playing cards are displayed. In one embodiment, one or more hands can be displayed on the video screen display 20 at the same time. As illustrated in FIG. 4, a first hand is shown at location 60. Each hand would preferably have five card locations preferably from left to right in a horizontal row, although other manners of displaying multiple hands including stacks of cards can be used. The video screen display 20 also contains a location at which the amount wagered on each hand is shown, for example, "Bet" 24. In this illustration, the player has bet 4 credits.

A button panel 40 is also provided on the gaming machine 10 with buttons mounted on the button panel 40 to be used by the player to control the operation of the gaming machine 10. Any suitable number or configuration of the buttons on the button panel can be used and, alternatively, conventional touch screen technology can be used for any or all of the buttons mounted on the button panel.

A typical button arrangement is shown on the button panel 40 in FIG. 4. A "BET ONE" button 42 is provided to allow the player to wager one credit at a time. A "BETMAX" button 44 is provided to allow the player to wager the maximum amount of credits permitted by the configuration of the gaming machine 10. Any number of credits can be set as the minimum or maximum amount that it is possible to wager on each hand. Typically, five credits may be the maximum number of credits for any particular hand. Alternatively, a BET ONE location 26 and a BETMAX location 28 can be provided on the video screen 20 to allow the player to wager by using conventional touch screen technology.

A conventional "DEAL/DRAW" button 46 is also provided on the button panel 40 which is used by the player to activate the initial deal of the cards at the deal stage of the method of play or the dealing of replacement cards at the draw stage of the method of play as is appropriate. Similarly, a DEAL/DRAW location 47 can be provided on the video screen 20 to allow the player to select either the deal step or the draw step by using conventional touch screen technology. The button panel 40 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location. The method of play of the various versions of the present invention will now be described. After the player has inserted an appropriate amount of coins, tokens, paper currency, or TITO to add a sufficient amount of credits on the credit display meter 22, the player makes his initial wager. The player may press the BET ONE button 42 one or more times to bet in single increments or the player may merely press the "BETMAX" button 44 and the maximum number of credits are applied, for example, five credits would be wagered. The player can also use the touch screen locations to make his wager as described above.

To play the poker game, the player establishes a pool of credits, sets the wager, deals the cards, chooses which cards to hold and discard, draws replacement cards, and collects credits for winning card combinations, with enhancements.

Buttons

In one embodiment, a set of buttons are mounted on the button panel 40 and are used by the player to control the functions of the poker game: BetOne 42, BetMax 44, Deal/Draw 46, Help 43, Pay Table 45, and Cash Out 41. Any or all of these control buttons may be displayed on the video display 20 and/or buttons electronically connected to the gaming device. If necessary, any number of buttons may be added to further facilitate control of the game, such as Hold buttons to "hold" the cards shown on the video display displayed.

Meters

In one embodiment, meters are shown on the video display screen to display the salient information for the game: Credits meter 22, Bet meter 24, and Paid meter 25. The Credits meter 22 displays the total number credits remaining in the credit pool; the Bet meter 24 displays the amount wagered on the current, previous, and/or upcoming poker hand and is associated with the BetOne 42 and BetMax 44 buttons; and the Paid meter 25 displays the amount of credits won on the current or previous poker hand.

Credit Pool

In one embodiment, the player deposits coins, tokens, paper currency, TITO, credit cards, debit cards, or other forms of physical and/or electronic currency into the coin acceptor slot 50 or a paper currency bill acceptor 52 to establish a pool of credits. The amount of this common pool of credits is displayed to the player on the Credit meter 22. The pool of credits increases and decreases according to the player's wins or losses and may be supplemented, if necessary, by the player by additional deposits of coins, tokens, paper currency, TITO, credit cards, debit cards, or other forms of physical and/or electronic currency.

Set the Wager

In one embodiment, the player sets the value of the wager by using the BetOne 42 and BetMax 44 buttons. The bet may range between one credit and N-credits, with N equal to a predetermined maximum or set by the current value of the credit pool. The typical video poker gaming machine uses a five credit maximum wager.

Deck of Cards

In one embodiment, each card dealt is selected from one or more suitable decks of cards such as one or more fifty-two card traditional decks (i.e. the traditional four suits of Spades, Hearts, Diamonds, Clubs, with thirteen ranks in each suit of two, three, four, five, six, seven, eight, nine, ten, Jack, Queen, King and Ace) plus bonus cards that may be added before or after the deal or the draw.

Deal of Cards

In one embodiment, the player causes the machine 10 to deal the cards by pressing the Deal button 46. Once the Deal button 46 is pressed, the wager is final and non-refundable.

For each deal, the machine 10 randomly displays five cards face-up in the five card positions. In a single standard deck embodiment, a displayed card is removed from the deck and may not be dealt again during that game. Typically, only the remaining non-dealt cards in the deck are used to replace a dealt card.

Hold and Discard

In one embodiment, the player selects which cards to hold and which cards to discard using the buttons on the machine 10 or touching the cards on the video display 20 (i.e. pressing a button or touching a card will "hold" the card) Alternatively, the machine 10 may automatically select cards to hold and/or discard and then allow the player to override the selections by using the buttons or touching the display screen 20. This may be useful in a training mode.

Winning Card Combinations

In one embodiment, the player is paid for predetermined winning combinations of cards that appear in the final hand. Each winning combination pays the amount indicated on a predetermined pay scale times the total amount wagered on that hand. Furthermore, the value of a winning card combination may be enhanced by the appearance of one or more Multi-Draw Bonus cards during the deal or draw; all enhanced values are also reflected on the pre-determined pay scale.

SUMMARY

The foregoing description of various embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A method of playing video poker with a computer, a random number generator, and a video display device, said method comprising the steps of:
   a. dealing, with the computer and random number generator, one card to form a preliminary secondary string poker hand of one card and displaying said card on the video display device;
   b. dealing, with the computer and random number generator, a primary poker hand of five cards and displaying said card on the video display device, selecting zero to five cards from the displayed primary poker hand and discarding any selected card;
   c. dealing, with the computer and random number generator, zero to five cards to the displayed primary poker hand to replace any discarded card to form a final primary poker hand of five cards;
   d. determining, with a computer, a payout based on a pre-determined pay scale for the final displayed primary poker hand when it is a winning poker hand;
   e. selecting one card from a the winning primary poker hand and placing a copy of the card in the secondary string hand to form a preliminary secondary string hand;
   f. determining a pay out, with the computer, based on a pre-determined pay scale for the cards in the secondary string poker hand when the cards are a winning poker hand;
   g. dealing another primary poker hand, with the computer and random number generator, and repeating the above method steps b, c, d, e, and f until the secondary string hand reaches five cards or a primary hand is not a winning hand.

2. The method of claim 1 wherein the primary poker hand and the secondary string hand are from a standard deck or multiple standard decks of 52 cards.

3. The method of claim 1 wherein the primary poker hand and the secondary poker hand are from the same deck of cards.

4. A video poker game system including a gaming console with a computer, a random number generator, and a video display, said system comprising the steps of:
   a. dealing one card with the computer and random number generator to form a preliminary secondary string poker hand of one card and displaying the card on the video display;
   b. dealing, with the computer and random number generator, a primary poker hand of five cards, selecting zero to five cards, displaying the cards on the video display, from the primary poker hand and discarding any selected card;
   c. dealing, with the computer and random number generator, zero to five cards to the primary poker hand to replace any discarded card to form a final primary poker hand of five cards;
   d. determining a payout with the computer based on a pre-determined pay scale for the final primary poker hand when it is a winning poker hand;
   e. selecting one card from a the winning primary poker hand and placing a copy of the card in the secondary string hand to form a preliminary secondary string hand;
   f. determining a pay out with the computer based on a pre-determined pay scale for the cards in the secondary poker hand when the cards are a winning poker hand;
   g. dealing another primary poker hand with the computer and random number generator and repeating the above method steps b, c, d, e, and f until the secondary string hand reaches five cards or a primary hand is not a winning hand.

5. The system of claim 4 wherein the primary poker hand and the secondary string poker hand are from a standard deck or multiple standard decks of 52 cards.

6. The system of claim 4 wherein the primary poker hand and the secondary string poker hand are from the same deck of cards.

7. In a video poker game system comprising a computer, random number generator, and a video display, wherein a primary poker hand is dealt and a payout is determined based on a pre-determined pay scale, the improvement wherein a preliminary secondary string poker hand of one initial card is established with the computer, random number generator, and displayed on the video display and one card from a winning primary hand is added to the preliminary secondary string hand, additional primary poker hands being dealt with one card from each winning primary hand being added to the secondary string hand, this sequence of steps being repeated until there is no winning primary hand or until the secondary string hand contains five cards, the winnings for the secondary string hand being determined for each secondary string hand of two or more until a primary hand loses.

8. The method of claim 7 wherein the primary poker hand and the secondary poker hand are from a standard deck or multiple standard decks of 52 cards.

9. The method of claim 7 wherein the primary poker hand and the secondary poker hand are from the same deck of cards.

\* \* \* \* \*